March 24, 1953 R. F. PFENNIG 2,632,779
PRODUCTION OF PARAXYLENE
Filed May 29, 1950
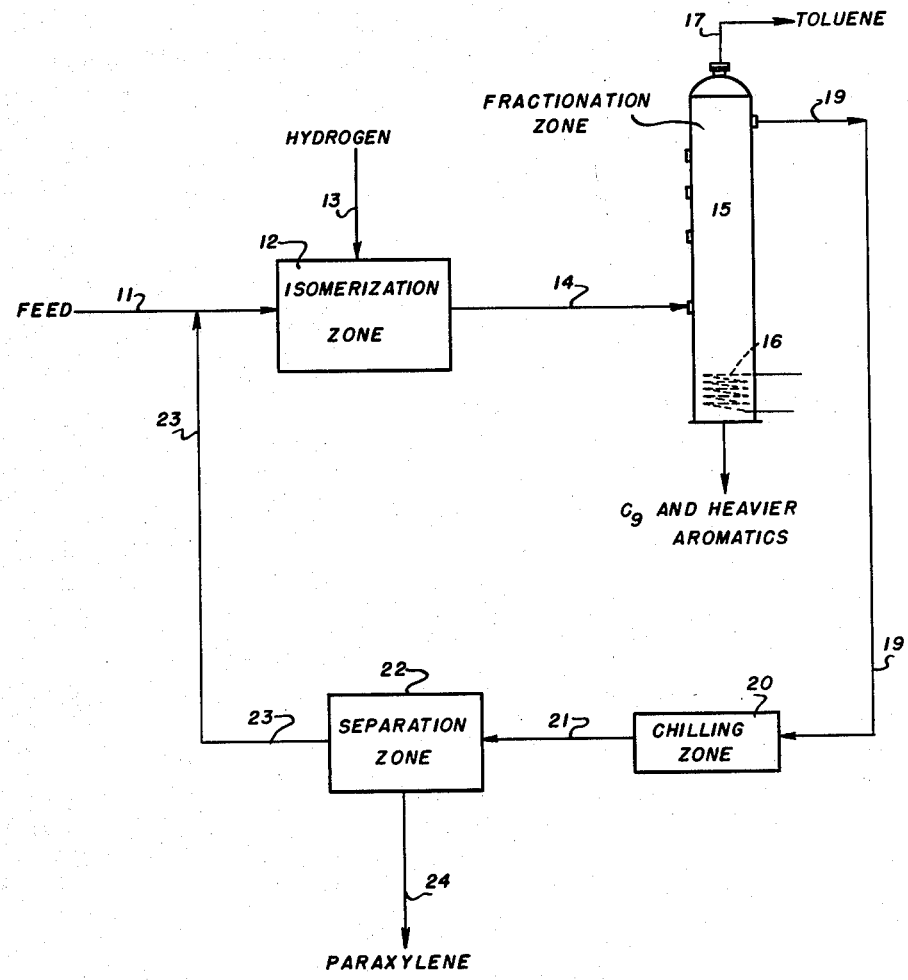
INVENTOR.
Reuben F. Pfennig,
BY
AGENT.

Patented Mar. 24, 1953

2,632,779

UNITED STATES PATENT OFFICE 2,632,779

PRODUCTION OF PARAXYLENE

Reuben F. Pfennig, Baytown, Tex., assignor, by mesne assignments, to Standard Oil Development Company, Elizabeth, N. J., a corporation of Delaware Application May 29, 1950, Serial No. 164,910

4 Claims. (Cl. 260—668)

The present invention is directed to the production of paraxylene and may be described briefly as involving the contacting of a metaxylene fraction with a catalyst selected from the oxides and sulfides of group VI of the periodic table at a temperature in the range between 800° and 1150° F. in the presence of hydrogen to form a product containing substantial quantities of paraxylene. The paraxylene is separated from the product and recovered while the substantially paraxylene-free product is then admixed with the metaxylene feed and recontacted with the catalyst. The invention specifically contemplates the isomerization of metaxylene to paraxylene by contact of the former with an oxide or sulfide catalyst selected from the oxides and sulfides of group VI of the periodic table in the presence of hydrogen.

The catalyst employed in the present invention may be oxides of chromium, tungsten or molybdenum or sulfides of these metals. The oxides or sulfides of the metals of group VI of the periodic table may be used as such as a catalyst but preferably will be employed as a supported catalyst; for example, a suitable supported catalyst is molybdenum oxide on alumina. Other supports which may be used include zinc oxide, silica, magnesia and spinel types of supports, and mixtures thereof.

The amount of hydrogen employed in the practice of the present invention will generally range from about 50 to 2500 cubic feet of hydrogen per barrel of feed. Good results may be obtained if amounts of hydrogen in the range of 1,000 to 2,000 cubic feet per barrel are employed.

Pressures employed in the practice of the present invention may range from about 50 to about 500 pounds per square inch gauge, with the preferred pressure in the range between 75 to 200 pounds per square inch gauge.

The feed may be contacted with the catalyst at a space velocity in the range of about 1 to about 5 volumes of feed per volume of catalyst per hour. A suitable space velocity is about 2 to 4 volumes of feed per volume of catalyst per hour.

The feed stock of the present invention may be substantially pure metaxylene or it may be a metaxylene-containing fraction which contains other aromatic hydrocarbons having 8 carbon atoms in the molecule; for example, the feed mixture may comprise metaxylene, orthoxylene and ethylbenzene. On the other hand, the feed mixture may suitably be a naphthenic hydrocarbon fraction boiling in the range between 200° to 350° F. This naphthenic hydrocarbon fraction on contact with the catalyst of the type mentioned before selected from group VI of the periodic table in the presence of hydrogen is converted to the corresponding aromatic fractions which on further contact with the catalyst causes the metaxylene contained therein to be isomerized to paraxylene.

Following the isomerization of metaxylene to paraxylene, the product may be subjected to a fractional distillation operation to remove all toluene and C9 and heavier aromatic hydrocarbon fractions therefrom leaving a product enriched in paraxylene from which the paraxylene may be subsequently separated by chilling to a temperature sufficiently low to form a slurry of paraxylene in a mother liquor. This slurry of paraxylene may then be subjected to a centrifuging operation or to a filtration operation to separate a cake of substantially pure paraxylene and a filtrate or mother liquor, depending on whether filtration or centrifugation is employed. In either event, the filtrate or mother liquor is admixed with the feed and subjected to recontact with the catalyst to isomerize remaining metaxylene to produce further amounts of paraxylene.

In the event the feed stock is an aromatic fraction comprised essentially of aromatic hydrocarbons having 8 carbon atoms in the molecule and containing metaxylene, small amounts of toluene and C9 and heavier aromatics may be produced. In this event, it will be desirable also to distill the isomerized product to separate hydrocarbons boiling below and above the boiling point of the feed mixture, following which the isomerized product which has been freed of hydrocarbons boiling below and above the boiling point of the feed mixture is subjected to chilling for separation of paraxylene and subsequent recycling of the substantially paraxylene-free product for recontact with the catalyst.

The invention will be further illustrated by reference to the drawing in which the single figure is a flow diagram of a preferred mode thereof.

Referring now to the drawing, numeral 11 designates a charge line through which a feed, comprising a metaxylene concentrate, is introduced into the system. The feed is introduced by line 11 into an isomerization zone 12 which is shown as a rectangle in the flow sheet. Isomerization zone 12 will be understood to comprise a plurality of reaction zones in which a catalyst of the type indicated is arranged. Isomerization zone 12 is also provided with heating equipment such as furnaces and the like and means for regeneration of the catalyst in cycles. In short, isomerization zone 12 includes means for maintaining a cycle operation wherein one reactor is on stream operation and another reactor is on a regeneration cycle. It will be understood also that isomerization zone 12 is provided with suitable separators and the like for separating unconsumed hydrogen and other gaseous materials from the product.

Isomerization zone 12 is maintained at a temperature in the range between 800° to 1150° F. and the feed introduced by line 11 is contacted with the catalyst therein at the temperature specified in the presence of hydrogen introduced by line 13. A sufficient amount of hydrogen is provided to supply an amount of from 50 to 2500 cubic feet of hydrogen per barrel of feed. Under conditions maintained in isomerization zone 12 the metaxylene is isomerized in substantial quantities to paraxylene. The isomerized product is withdrawn from isomerization zone 12 by line 14 and discharged thereby into a fractionation zone 15 which may be a plurality of distillation towers equipped with suitable internal baffling equipment, such as bell cap trays and the like, whereby intimate contact between vapors and liquids may be maintained. It is understood that fractionation zone 15 is provided with means for inducing reflux. For purposes of simplification of the description, fractionation zone 15 is shown as a single distillation tower provided with heating means illustrated by a steam coil 16 and line 17 for removal overhead of fractions boiling below the boiling point of the feed mixture, when the feed is a metaxylene concentrate or a mixture of $C_8$ aromatic hydrocarbons, or for removal overhead of the toluene when the feed is a naphthenic hydrocarbon fraction boiling in the range between 200° and 350° F.

Fractionation zone 15 is also provided with line 18 for withdrawal of $C_9$ and heavier aromatic hydrocarbons and line 19 for segregation of the isomerized product enriched in paraxylene. This isomerized product contains substantial amounts of paraxylene and may be discharged into a chilling zone 20 which may be of a scraped surface type wherein the temperature of the isomerized product is reduced to a temperature sufficiently low to cause the formation of a slurry of paraxylene. Usually this temperature will be the eutectic temperature of paraxylene and one of the components of the mixture. Ordinarily a temperature in the range from about −50° to about −110° F. will be satisfactory to form the slurry of paraxylene in the isomerized product in chilling zone 20. The chilled isomerized product is then discharged from chilling zone 20 by line 21 into separation zone 22 which may be a centrifuge of the basket type or may be a suitable filter. For purposes of description it is assumed that separation zone 22 is a centrifuge of the basket type which may be operated at a rate in the range from 400 to 1000 times gravity for a sufficient length of time to cause separation of substantially pure paraxylene. The mother liquor from which the paraxylene crystals are separated in separation zone 22 is withdrawn from zone 22 by line 23 and recycled in admixture with the feed in line 11 to isomerization zone 12 for recontact with the catalyst therein and for isomerization of unconverted metaxylene. The paraxylene which is separated in separation zone 22 may be warmed by means not shown and withdrawn as a liquid stream by means of line 24.

It will be seen from the foregoing description in conjunction with the drawing of my process that a simple, commercially adaptable mode is provided for producing substantial quantities of paraxylene from metaxylene.

In order to illustrate the invention further a metaxylene concentrate containing 96% by volume of metaxylene was contacted with a supported molybdenum oxide catalyst at a temperature of 940° F. and at a pressure of 215 pounds per square inch gauge. The metaxylene concentrate was charged in contact with the catalyst at a space velocity of 1 volume of feed per volume of catalyst per hour and hydrogen was employed in a molar ratio of 2 parts of hydrogen to 1 part of metaxylene. A yield of liquid product corresponding to 96.4% by volume of the feed was obtained containing 89.9% by volume of aromatics having 8 carbon atoms in the molecule, 4.1% by volume of toluene and 2.4% by volume of $C_9$ and heavier aromatics, the remainder being gaseous products. The $C_8$ aromatic fraction which contained paraxylene as a result of isomerization of metaxylene was then analyzed, the results of which are shown in Table I.

TABLE I

|  | Mole Percent |
|---|---|
| Ethylbenzene | 5.2 |
| Orthoxylene | 5.3 |
| Metaxylene | 74.2 |
| Paraxylene | 15.3 |
| Total | 100.0 |

It will be seen from the foregoing analysis that substantial quantities of the metaxylene had been converted to paraxylene. The results are even more significant when the analysis is shown with the metaxylene excluded as illustrated by Table II.

TABLE II

| Ethylbenzene | 20.2 |
|---|---|
| Orthoxylene | 20.5 |
| Paraxylene | 59.3 |
| Total | 100.0 |

The thermodynamic equilibrium concentration of paraxylene in the presence of metaxylene at 940° F. is 20.8 mole per cent. It will be seen that the amount actually formed was 15.3 mole per cent which is slightly over 73% of the conversion theoretically possible.

By separating out the unconverted metaxylene and recycling it to contact with the catalyst, conversion of over fifty per cent of the metaxylene to paraxylene may be obtained.

Another run was made where an orthoxylene concentrate was contacted with the same catalyst under conditions similar to those reported in the preceding example. Substantially no isomerization occurred but the orthoxylene, rather than isomerizing to any appreciable degree, was converted in part to toluene by a mechanism which is believed to involve demethylation. From this run it was concluded that orthoxylene does not isomerize under the conditions employed.

It has been observed in the contacting of aromatic concentrates having 8 carbon atoms in the molecule that mixtures of isomeric xylenes and ethylbenzene are obtained in the approximate concentration as shown in Table III.

TABLE III

| | Percent |
|---|---|
| Metaxylene | 40 |
| Paraxylene | 15 |
| Orthoxylene | 20 |
| Ethylbenzene | 15 |

It is believed that the reason the isomeric xylenes are formed in the foregoing concentrations shown in Table III may be due in part to isomerization. It is believed that under the conditions obtaining in the equivalent of isomerization zone 12 when a naphthenic hydrocarbon fraction boiling in the range between 200° and 350° F. containing substituted cyclohexanes having 8 carbon atoms in the molecule is contacted that these substituted cyclohexanes are in approximately thermodynamic equilibrium concentrations and that these equilibrium concentrations are similar to those of the corresponding C8 aromatic isomers. It is also believed that the substituted cyclohexanes having 8 carbon atoms in the molecule are converted to metaxylene in part and the metaxylene under the conditions of contact with the catalyst at temperatures and pressures specified in the presence of hydrogen may be in part isomerized to paraxylene. Thus, in accordance with the present invention by contacting such a fraction with the catalyst of the type illustrated and separating paraxylene from the isomerized product, the metaxylene may be recycled to contact with the catalyst to convert it substantially to paraxylene.

It will be understood that the explanation of the possible mechanism of the present invention is given by way of a better understanding of the invention and not to be considered as limiting the invention to the particular theory of the reactions involved.

The nature and objects of the present invention having been fully described and illustrated, what I wish to claim as new and useful and to secure by Letters Patent is:

1. A method for producing paraxylene from a feed stock fraction consisting of C8 aromatic hydrocarbons containing metaxylene from which as much paraxylene has been removed as can be separated by chilling to a low temperature to crystallize the paraxylene as crystals and separating the paraxylene crystals therefrom which comprises contacting said feed stock fraction with a catalyst selected from the oxides and sulfides of the metals from group VI of the periodic table at a temperature in the range between 800° and 1150° F. in the presence of 50 to 2500 cubic feet of hydrogen per barrel of said feed mixture and a pressure in the range of 50 to 500 p. s. i. g. and at a space velocity of 1 to 5 volumes of feed per volume of catalyst per hour to form a product comprising substantial quantities of paraxylene, removing from said product fractions boiling below and above the boiling point of said feed mixture, chilling said product from which fractions boiling below and above the said feed mixture have been removed to a temperature sufficiently low to form a slurry of paraxylene crystals, separating said slurry into a filter cake of paraxylene crystals and a mother liquor and returning said mother liquor to said catalyst as said feed stock fraction.

2. A method in accordance with claim 1 in which the catalyst is molybdenum oxide on alumina.

3. A method for producing paraxylene which includes the steps of admixing a feed stock fraction consisting of C8 aromatic hydrocarbons containing metaxylene from which as much paraxylene has been removed as can be separated by chilling to form a slurry of paraxylene crystals and mother liquor and separating said paraxylene crystals from the mother liquor to form said first feed stock fraction with a second feed stock fraction consisting of a naphthenic hydrocarbon fraction boiling in the range between 200° and 300° F. to form a final feed stock, contacting said final feed stock with a catalyst selected from the oxides and sulfides of the metals of group VI of the periodic table at a temperature in the range between 800° and 1150° F. in the presence of 50 to 2500 cubic feet of hydrogen per barrel of said feed mixture at a pressure in the range of 50 to 500 p. s. i. g. and at a space velocity of 1 to 5 volumes of feed per volume of catalyst per hour to form a product comprising substantial quantities of paraxylene, removing from said product fractions boiling below and above the boiling point of said feed mixture, chilling said product from which fractions boiling below and above said feed mixture have been removed to a temperature sufficiently low to form a slurry of paraxylene crystals, separating said slurry into a filter cake of paraxylene crystals and a mother liquor and returning said mother liquor to contact with the catalyst as said first feed stock fraction.

4. A method in accordance with claim 3 in which the catalyst is molybdenum oxide on alumina.

REUBEN F. PFENNIG.

REFERENCES CITED

The following references are of record in the file of this patent:

UNITED STATES PATENTS

| Number | Name | Date |
|---|---|---|
| 2,378,210 | Fuller et al. | June 12, 1945 |
| 2,403,757 | Reeves | July 9, 1946 |
| 2,425,559 | Passino et al. | Aug. 12, 1947 |
| 2,426,824 | Fuller et al. | Sept. 2, 1947 |
| 2,496,253 | Purcell et al. | Jan. 31, 1950 |

OTHER REFERENCES

Ipatieff, Jour. Amer. Chem. Soc., vol. 55 (September 1933), pages 3696–3701 (5 pages).